United States Patent
Yang et al.

(10) Patent No.: US 9,564,788 B2
(45) Date of Patent: Feb. 7, 2017

(54) MOTOR WITH COOLING DEVICE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Tian-En Zhang, Jiashan (CN); Jian-Shi Jia, Jiashan (CN); Wei-Chuan Zhang, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 127 days.

(21) Appl. No.: 14/492,353

(22) Filed: Sep. 22, 2014

(65) Prior Publication Data
US 2015/0097451 A1  Apr. 9, 2015

(30) Foreign Application Priority Data
Oct. 9, 2013  (CN) .................... 2013 2 0619762 U

(51) Int. Cl.
| | |
|---|---|
| *H02K 1/32* | (2006.01) |
| *H02K 9/19* | (2006.01) |
| *H02K 7/102* | (2006.01) |
| *H02K 9/20* | (2006.01) |
| *H02K 3/24* | (2006.01) |

(52) U.S. Cl.
CPC ................ *H02K 9/19* (2013.01); *H02K 7/102* (2013.01); *H02K 9/20* (2013.01); *H02K 1/32* (2013.01); *H02K 3/24* (2013.01)

(58) Field of Classification Search
CPC .............. H02K 9/19; H02K 9/20; H02K 1/32; H02K 3/24
See application file for complete search history.

(56) References Cited

U.S. PATENT DOCUMENTS

| | | | | |
|---|---|---|---|---|
| 2,894,155 A * | 7/1959 | Labastie | ................... | H02K 9/19 188/264 D |
| 3,217,193 A * | 11/1965 | Rayner | ..................... | H02K 9/20 165/903 |
| 3,306,074 A * | 2/1967 | Wilson | ................... | F25B 31/002 310/64 |
| 3,488,532 A * | 1/1970 | Anderson | ................ | H02K 3/24 310/211 |
| 3,659,125 A * | 4/1972 | Basel | ........................ | H02K 9/19 239/225.1 |
| 4,574,210 A * | 3/1986 | Wieland | .................... | H02K 9/20 310/59 |

(Continued)

*Primary Examiner* — Dang Le
(74) *Attorney, Agent, or Firm* — Zhigang Ma

(57) ABSTRACT

A motor includes a main body and a cooling device. The cooling device includes a mounting seat defining an inlet hole and an outlet hole spaced from the inlet hole, and a cooling pipe communicating with the inlet hole and defining a plurality of ejection holes on a sidewall. The main body includes a rotor sleeved and sealed on the mounting seat. The cooling pipe is received in the rotor. Cooling liquid sprays at the rotor via the inlet hole and the ejection holes, and then the cooling liquid flow out of the rotor via the outlet hole.

18 Claims, 5 Drawing Sheets

(56) References Cited

U.S. PATENT DOCUMENTS

| | | | | |
|---|---|---|---|---|
| 4,647,805 A | * | 3/1987 | Flygare | H02K 9/193 310/53 |
| 6,657,333 B2 | * | 12/2003 | Shoykhet | H02K 55/04 310/60 A |
| 7,952,240 B2 | * | 5/2011 | Takenaka | H02K 1/20 310/260 |
| 8,928,195 B2 | * | 1/2015 | Ohashi | H02K 1/32 310/54 |

\* cited by examiner

MOTOR WITH COOLING DEVICE

FIELD

The subject matter herein generally relates to motors, and particularly, to a motor with a cooling device which can cool a rotor.

BACKGROUND

In general, a motor includes a rotating shaft, a rotor that surrounds the rotating shaft, a stator that is spaced a predetermined interval from the rotor, and a housing holding the stator. The rotating shaft may be supported by the housing. When current is applied to the stator, the rotor rotates due to interaction between the stator and the rotor.

BRIEF DESCRIPTION OF THE DRAWINGS

Implementations of the present technology will now be described, by way of example only, with reference to the attached figures.

DETAILED DESCRIPTION

Figure 1:
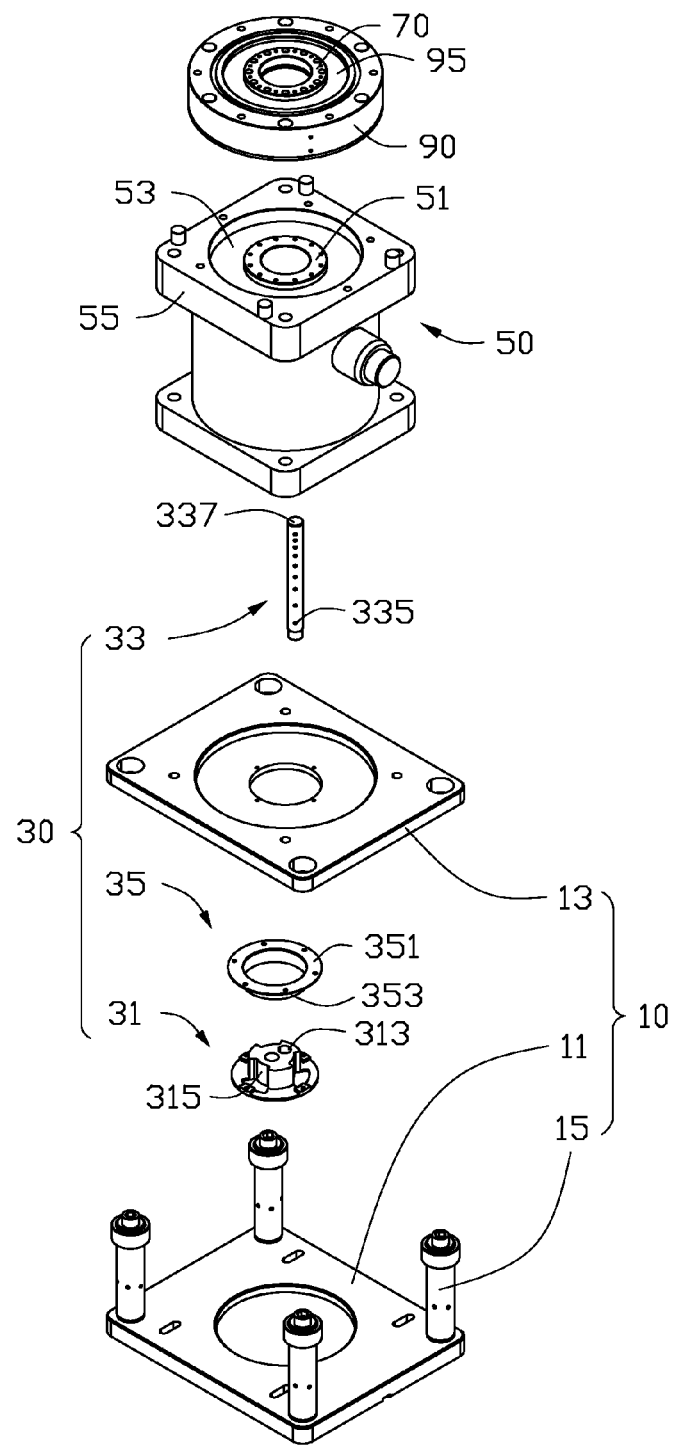
FIG. 1 is an exploded, isometric view of an embodiment of a motor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A motor can include a fixed seat, a cooling device, a main body, and a rotating shaft. The cooling device can include a mounting seat installed on the fixed seat and defining an inlet hole and an outlet hole spaced from the inlet hole, and a cooling pipe communicating with the inlet hole and defining a plurality of ejection holes on a sidewall. The main body can include a rotor sleeved and sealed on the mounting seat and configured to receive the cooling pipe, a stator sleeved on the rotor, and a housing sleeved on the stator and supported by the fixed seat. The rotating shaft can be coupled to the rotor. The inlet hole can be configured to enable cooling liquid to flow into the cooling pipe. The ejection holes can be configured to enable the cooling liquid to be sprayed at the rotor, and the outlet can be configured to enable the cooling liquid to flow out of the rotor.

A motor can include a cooling device and a main body. The cooling device can include a mounting seat defining an inlet hole and an outlet hole spaced from the inlet hole and a cooling pipe. The cooling pipe which communicates with the inlet hole can include a sealed end portion, and a plurality of ejection holes defined on a sidewall. The main body can include a rotor sleeved and sealed on the mounting seat and configured to receive the cooling pipe, a stator sleeved on the rotor, and a housing sleeved on the stator. The inlet hole can be configured to enable cooling liquid to flow into the cooling pipe. The ejection holes can be configured to enable the cooling liquid to be sprayed at the rotor, and the outlet can be configured to enable the cooling liquid to flow out of the rotor.

Figure 2:
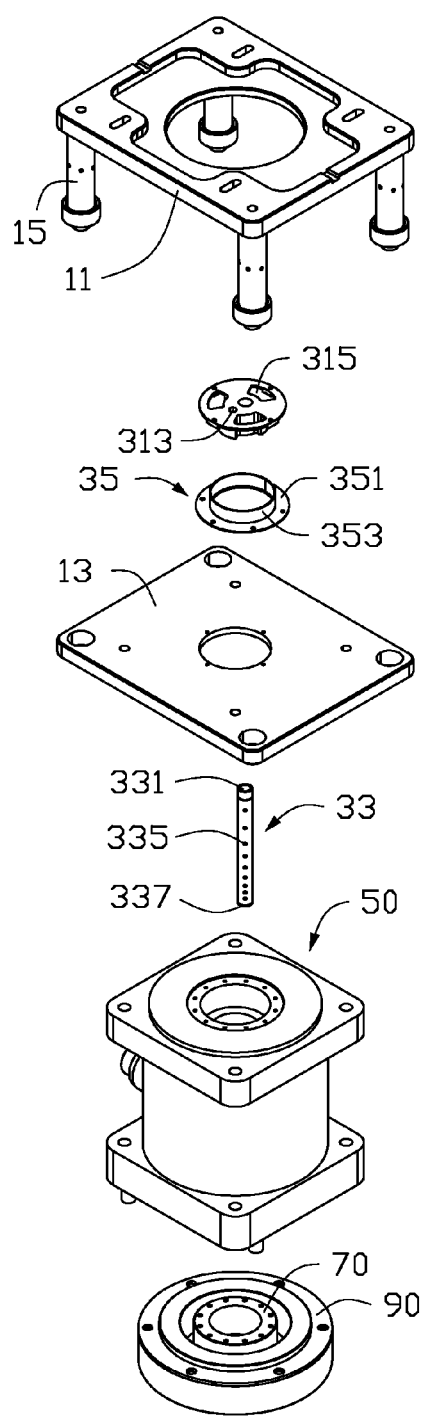
FIG. 2 is similar to the FIG. 1 but viewed from another aspect.
Figure 3:
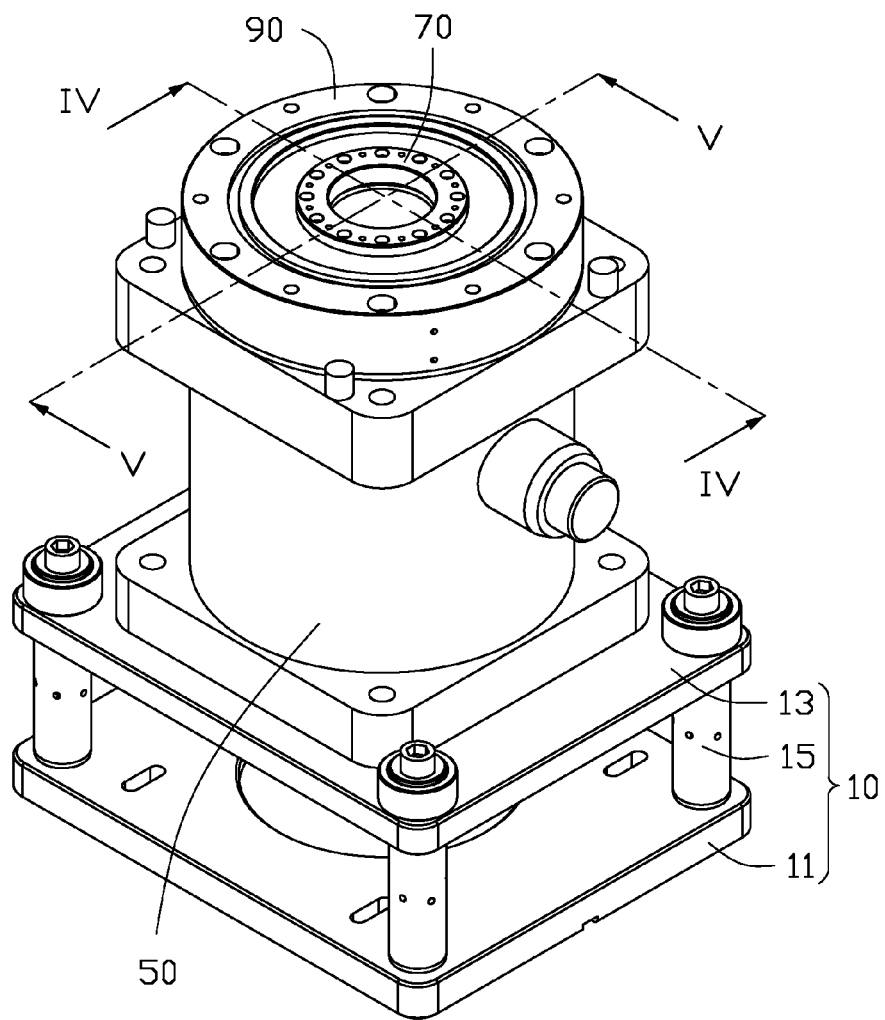
FIG. 3 is an isometric view of the motor of FIG. 1.

FIGS. 1 to 3 illustrate an embodiment of a motor 100 that can include a fixed seat 10, a cooling device 30, a main body 50, a rotating shaft 70, and a brake assembly 90. The main body 50 and the cooling device 30 can both be installed on the fixed seat 10. The cooling device 30 can be received in the main body 50. The rotating shaft 70 can be coupled to the main body 50 and extend through the brake assembly 90. The brake assembly 90 can be installed on the main body 50 and can be configured to lock the rotating shaft 70. The main body 50 can be configured to rotate the rotating shaft 70. In at least one embodiment, the motor 100 can be a direct drive motor.

Figure 4:
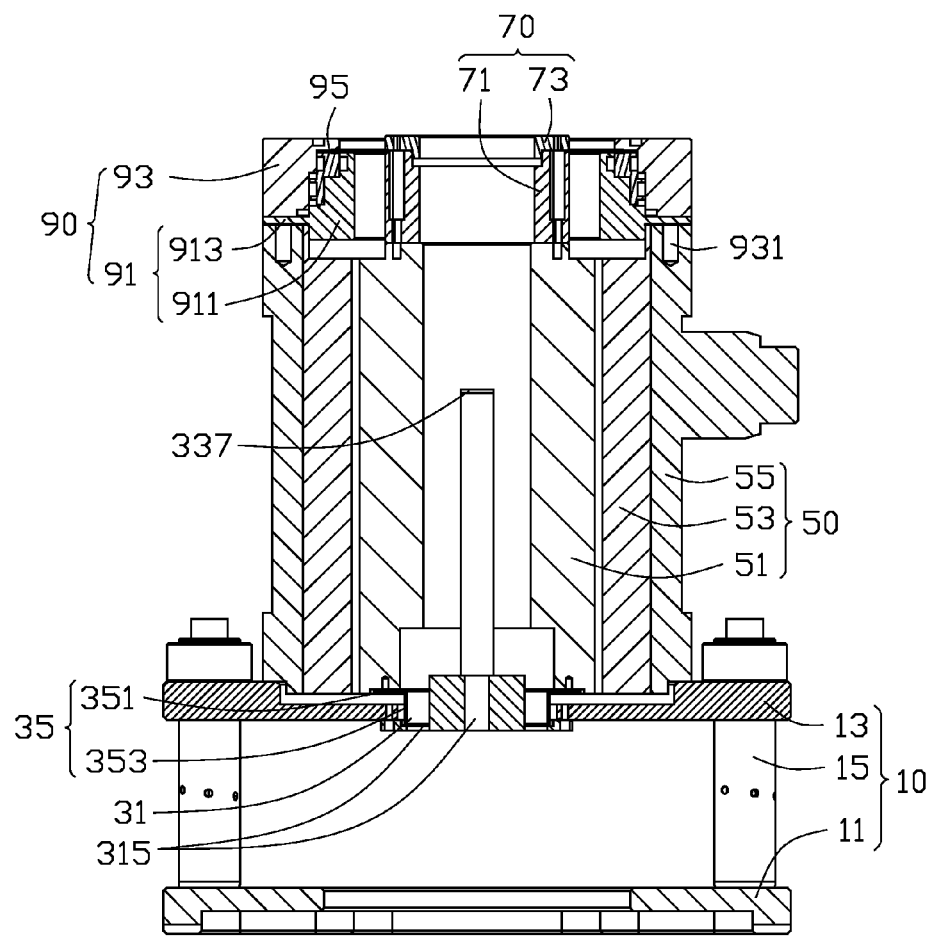
FIG. 4 is a cross-sectional view of the motor of FIG. 3, taken along line IV-IV of FIG. 3.
Figure 5:
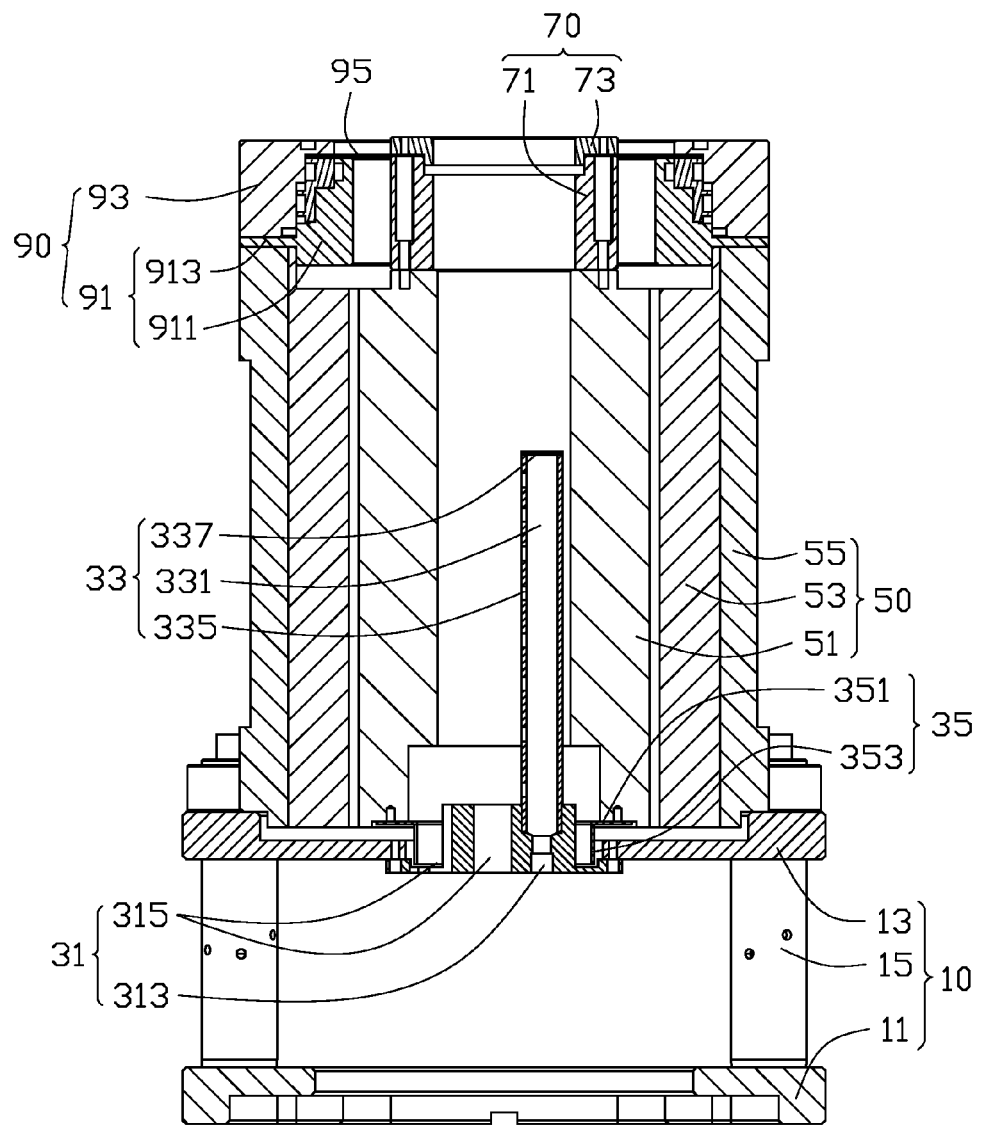
FIG. 5 is a cross-sectional view of the motor of FIG. 3, taken along line V-V of FIG. 3.

FIGS. 4 and 5 illustrate that the fixed seat 10 can include a bottom plate 11, four support shafts 15, and a base seat 13. The four support shafts 15 can be installed on the bottom plate 11, extending substantially perpendicularly to the bottom plate 11, and coupled to the base seat 13, so that the four support shafts 15 can interconnect the bottom plate 11 and the base seat 13. The base seat 13 can be supported by the four support shafts 15 parallel to the bottom plate 11.

FIG. 4 illustrates that the main body 50 can include a rotor 51, a stator 53, and a housing 55. The rotor 51, the stator 53, and the housing 55 can all be substantially hollow and cylindrical. The cooling device 30 can include a mounting seat 31, a cooling pipe 33 coupled to the mounting seat 31, and a waterproof ring 35. The mounting seat 31 can be installed on the base seat 13. The waterproof ring 35 can be sleeved on the mounting seat 31, and coupled to an end of the rotor 51 adjacent to the fixed seat 10, and can rotate with the rotor 51. The rotor 51 can be sleeved on the mounting seat 31. The cooling pipe 33 can be received in the rotor 51. The stator 53 can be sleeved on the rotor 51 and can be located at a side of the base seat 13 away from the bottom plate 11. The housing 55 can be sleeved on the stator 53 and can be supported by the base seat 13.

FIG. 1 illustrates that an inlet hole 313 and an outlet hole 315 can be defined on a first end of the mounting seat 31. The inlet hole 313 can extend through the first end and an opposite second end of the mounting seat 31 along an axis of the mounting seat 31. The outlet hole 315 can also extend through the first end and the opposite second end of the mounting seat 31 along the axis of the mounting seat 31, and can be spaced away from the inlet hole 313. A first end of the inlet hole 313 can be coupled to an inlet pipe (not shown), and a second end of the inlet hole 313 can be coupled to the cooling pipe 33, in this way, cooling liquid (not shown) can flow into the cooling pipe 33 via the inlet hole 313. The outlet hole 315 can be configured to enable the cooling liquid to flow out of the rotor 51. In at least one embodiment, the inlet hole 313 can be spaced away from a center axis of the mounting seat 31 and be substantially stepped. A diameter of an end of the inlet hole 313 adjacent to the fixed seat 10 can be greater than a diameter of an end away from the fixed seat 10. The mounting seat 31 can define four outlet holes 315. One outlet hole 315 can be at a center portion of the mounting seat 31, and the other three outlet holes 315 can be spaced from each other around the center axis of the mounting seat 31.

The cooling pipe 33 can be inserted into the inlet hole 313 and can define a chamber 331 communicating with the inlet hole 313. An end of the cooling pipe 33 away from the inlet hole 313 can be sealed to prevent the cooling liquid from flowing out of the end portion of the cooling pipe 33. In at least one embodiment, a first cover 337 can cover and seal the end of the cooling pipe 33 away from the inlet hole 313. The cooling pipe 33 can define a plurality of ejection holes 335 on a sidewall. The ejection holes 335 can communicate with the chamber 331 and can be configured to eject the cooling liquid out of the cooling pipe 33. The ejection holes 335 can be arranged along a straight line parallel to a center axis of the cooling pipe 33, and a distance between two adjacent ejection holes 335 can gradually decrease along a direction away from the mounting seat 31. In this way, the cooling liquid flowing out of the cooling pipe 33 can gradually increase from the end of the cooling pipe 33 adjacent to the mounting seat 31 to the end of the cooling pipe 33 away from the mounting seat 31.

The waterproof ring 35 can be installed on an end of the rotor 51 adjacent to the fixed seat 10 and can be configured to prevent the cooling liquid which flows through the rotor 51 from being sprayed to the stator 53. In at least one embodiment, the waterproof ring 35 can include a ring portion 351 and a sleeve portion 353 extending from a periphery of an inside wall of the ring portion 351 toward an outer space. The ring portion 351 can be coupled to an end of the rotor 51 adjacent to the fixed seat 10. The sleeve portion 353 can be located on an end of the ring portion 351 adjacent to the mounting seat 31 and can be sleeved on the mounting seat 31. In at least one embodiment, a diameter of the sleeve portion 353 can be smaller than that of the ring portion 351. A contacting surface of the waterproof ring 35 and the rotor 51 can be coated with a sealing adhesive.

The rotating shaft 70 can include a transmission portion 71 and an output portion 73. A first end of the transmission portion 71 can be coupled to the rotor 51, so that the transmission portion 71 can rotate with the rotor 51. The output portion 73 can be coupled to a second end of the transmission portion 71 away from the rotor 51 and can be configured to be coupled to other devices (not shown), such as a transmission device, to transmit power.

The brake assembly 90 can include a fixed ring 91, a second cover 93, and a brake member 95. The fixed ring 91 can be sleeved on the rotating shaft 70. The second cover 93 can be sleeved on the fixed ring 91. The fixed ring 91 can include a stepped base body 911 and a connecting portion 913 protruding from an outside wall of the stepped base body 911. The brake member 95 can be installed on an end of the stepped base body 911 away from the fixed seat 10 and can be coupled to the transmission portion 71. The brake member 95 can rotate with the transmission portion 71 and can stop the transmission 71 portion from rotating via an air pressure device (not shown). In this way, the brake member 95 can stop the rotating shaft 70 from rotating, and can stop the rotor 51 from rotating further. The second cover 93 can be sleeved on the stepped base body 911 of the fixed ring 91 and the brake member 95, and can be fastened on the connecting portion 913 of the fixed ring 91 and the housing 55 of the main body 50 via a plurality of screws 931. The connecting portion 913 can be sandwiched between the second cover 93 and the housing 55.

In assembly, the base seat 13 can be coupled to the bottom plate 11 via the support shafts 15. The mounting seat 31 can be installed on a side of the base seat 13 away from the bottom plate 11. The sleeve portion 353 of the waterproof ring 35 can be sleeved on the mounting seat 31. The cooling pipe 33 can be inserted into the inlet hole 313 and can be located at a side of the mounting seat 31 away from the bottom plate 11. The main body 50 can be sleeved on the cooling device 30 and can be supported by the mounting seat 13. The transmission portion 71 of the rotating shaft 70 can be installed on the end of the rotor 51 away from the bottom plate 11. The brake assembly 90 can be sleeved on the rotating shaft 70 and can be installed on the housing 55.

In use, when the motor 100 begins to work, the cooling liquid can flow into the cooling pipe 33 via the inlet hole 313 and be sprayed at the rotor 51 via the ejection holes 335. In this way, the rotor 51 can be cooled. The cooling liquid flowing through the rotor 51 can flow out of the motor 100 via the outlet hole 315 of the mounting seat 31.

In at least one embodiment, the support shaft 15 and the bottom plate 11 can be omitted, the base seat 13 can be directly located on a working table (not shown). The ejection holes 335 can be arranged in other shapes, such as arranged in a matrix, as long as the cooling liquid can be sprayed at the rotor 51 via the ejection holes 335. The first cover 337 can be omitted as long as the cooling liquid cannot flow out of the cooling pipe 33 from an end of the cooling pipe 33 away from the bottom plate 11.

In at least one embodiment, a sealing ring can replace the waterproof ring 35, as long as the rotor 51 can be sealed on the fixed seat 10 to prevent the cooling liquid from flowing into the stator 53.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure, as defined by the appended claims.

What is claimed is:
1. A motor comprising:
   a fixed seat, the fixed seat comprising:
      a bottom plate,
      a base seat parallel to, and spaced from, the bottom plate, and
      four support shafts interconnecting the bottom plate and the base seat;
   a cooling device comprising:

a mounting seat installed on the base seat of the fixed seat and defining an inlet hole and an outlet hole spaced from the inlet hole, and a cooling pipe communicating with the inlet hole and defining a plurality of ejection holes on a sidewall thereof, one end of the cooling pipe being inserted into the inlet hole of the mounting seat;

a main body comprising:
  a rotor sleeved and sealed on the mounting seat and configured to receive the cooling pipe,
  a stator sleeved on the rotor, and
  a housing sleeved on the stator and supported by the base seat of the fixed seat; and
a rotating shaft coupled to the rotor,
wherein the inlet hole is configured to enable cooling liquid to flow into the cooling pipe, the outlet is configured to enable the cooling liquid, being sprayed at the rotor via the ejection holes, to flow out of the rotor.

2. The motor of claim 1, wherein the cooling pipe further defines a chamber communicating with the inlet hole and the plurality of ejection holes.

3. The motor of claim 1, wherein the cooling device further comprises a waterproof ring sleeved on the mounting seat and coupled to an end of the rotor adjacent to the fixed seat, wherein the waterproof ring is configured to rotate with the rotor.

4. The motor of claim 3, wherein the waterproof ring comprises:
  a ring portion coupled to an end of the rotor adjacent to the fixed seat and configured to rotate with the rotor, and
  a sleeve portion extending from a periphery of an inside wall of the ring portion toward an outer space and sleeved on the mounting seat.

5. The motor of claim 1, wherein the inlet hole is stepped, and a diameter of an end of the inlet hole adjacent to the fixed seat is greater than a diameter of an end away from the fixed seat.

6. The motor of claim 1, wherein the plurality of ejection holes are arranged along a straight line parallel to a center axis of the cooling pipe, and a distance between two adjacent ejection holes gradually decreases along a direction away from the mounting seat.

7. The motor of claim 1, wherein a first cover seals an end portion of the cooling pipe.

8. The motor of claim 1, wherein the rotating shaft comprises a transmission portion coupled to the rotor and an output portion coupled to the transmission portion.

9. The motor of claim 1, wherein the motor further comprises a brake assembly comprising:
  a fixed ring comprising a stepped base body sleeved on the rotating shaft and a connecting portion protruding from an outside wall of the stepped base body,
  a brake member installed on an end of the stepped base body away from the fixed seat and coupled to the shaft, and
  a second cover sleeved on the stepped base body and the brake member and fastened on the connecting portion,
wherein the brake member is configured to stop the rotating shaft from rotating.

10. A motor comprising:
  a cooling device comprising:
    a mounting seat defining an inlet hole and an outlet hole spaced from the inlet hole, and
    a cooling pipe communicating with the inlet hole, with a sealed end portion, and defining a plurality of ejection holes on a sidewall thereof, one end of the cooling pipe being inserted into the inlet hole of the mounting seat; and
  a main body comprising;
    a rotor sleeved and sealed on the mounting seat and configured to receive the cooling pipe,
    a stator sleeved on the rotor, and
    a housing sleeved on the stator;
  a rotating shaft coupled to the rotor; and
  a brake assembly comprising:
    a fixed ring comprising a stepped base body sleeved on the rotating shaft and a connecting portion protruding from an outside wall of the stepped base body,
    a brake member installed on an end of the stepped base body away from the fixed seat and coupled to the shaft, and
    a second cover sleeved on the stepped base body and the brake member and fastened on the connecting portion,
  wherein the brake member is configured to stop the rotating shaft from rotating; and
  wherein the inlet hole is configured to enable cooling liquid to flow into the cooling pipe, the outlet is configured to enable the cooling liquid being sprayed at the rotor via the ejection holes to flow out of the rotor.

11. The motor of claim 10, wherein the cooling pipe further defines a chamber communicating with the inlet hole and the plurality of ejection holes therein.

12. The motor of claim 10, wherein the cooling device further comprises a waterproof ring sleeved on the mounting seat and coupled to an end of the rotor, wherein the waterproof ring is configured to rotate with the rotor.

13. The motor of claim 12, wherein the waterproof ring comprises:
  a ring portion coupled to an end of the rotor and configured to rotate with the rotor, and
  a sleeve portion extending from a periphery of an inside wall of the ring portion toward an outer space and sleeved on the mounting seat.

14. The motor of claim 10, wherein the inlet hole is stepped, and a diameter of an end of the inlet hole away from the rotor is greater than a diameter of an end thereof adjacent to the rotor.

15. The motor of claim 10, wherein the plurality of ejection holes are arranged along a straight line parallel to a center axis of the cooling pipe, and a distance between two adjacent ejection holes gradually decreases along a direction away from the mounting seat.

16. The motor of claim 10, wherein the motor further comprises a fixed seat comprising:
  a bottom plate,
  a base seat parallel to, and spaced from the bottom plate, and
  four support shafts interconnecting the bottom plate and the base seat,
  wherein the mounting seat is installed on the base seat, and the housing is supported by the base seat.

17. The motor of claim 10, wherein a first cover seals an end portion of the cooling pipe.

18. A motor comprising:
  a fixed seat comprising:
    a bottom plate,
    a base seat parallel to, and spaced from the bottom plate,
    and four support shafts interconnecting the bottom plate and the base seat;
  a cooling device comprising:

a mounting seat defining an inlet hole and an outlet hole spaced from the inlet hole, and
a cooling pipe communicating with the inlet hole, with a sealed end portion, and defining a plurality of ejection holes on a sidewall thereof; and a main body comprising;
a rotor sleeved and sealed on the mounting seat and configured to receive the cooling pipe,
a stator sleeved on the rotor, and
a housing sleeved on the stator, wherein the inlet hole is configured to enable cooling liquid to flow into the cooling pipe, the outlet is configured to enable the cooling liquid being sprayed at the rotor via the ejection holes to flow out of the rotor; and wherein the mounting seat is installed on the base seat, and the housing is supported by the base seat.

* * * * *